Patented July 18, 1939

2,166,518

UNITED STATES PATENT OFFICE 2,166,518

COMPOSITIONS OF MATTER

Solomon Caplan, New York, N. Y., assignor, by mesne assignments, to Harvel Research Corporation, a corporation of New Jersey No Drawing. Application January 22, 1936, Serial No. 60,343

2 Claims. (Cl. 260—36)

The present invention relates to plasticised compositions which include moldable solid and semi-solid compositions and liquid compositions such as lacquers and in which are used -glycerol phenyl ether or derivatives of -glycerol phenyl ethers having one or more hydrocarbon substituents on the benzene nucleus.

Examples of the plasticisers of the present invention are

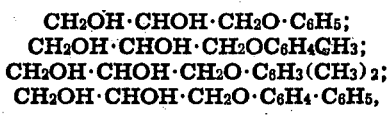

$CH_2OH \cdot CHOH \cdot CH_2O \cdot C_6H_5$;
$CH_2OH \cdot CHOH \cdot CH_2OC_6H_4CH_3$;
$CH_2OH \cdot CHOH \cdot CH_2O \cdot C_6H_3(CH_3)_2$;
$CH_2OH \cdot CHOH \cdot CH_2O \cdot C_6H_4 \cdot C_6H_5$, these being the -glycerol ethers of phenol, the several cresols, the several xylenols and of the several phenyl phenols, respectively. Any one of these ethers or any mixture thereof can be used. For example, the mixed -glycerol ethers made from a commercial mixture of phenols containing about 30 per cent phenol, 50 per cent ortho-cresol and the rest meta and para cresols. Another more specific example is the -glycerol ether of 1·4·2 xylenol. Still another is -glycerol ether of para phenyl phenol. These are given as working examples and should not be considered as given to limit the claims hereof because other -glycerol ethers of the kind described but not herein named can be used severally and in various mixtures, including mixtures comprising any or all of the examples given above and hereinafter. Further examples are glycerol ether of tertiary butyl phenol (ortho, meta or para); -glycerol ether of para di-amyl phenol; and -glycerol ether of para–tertiary butyl ortho cresol.

Examples of the materials which can be plasticised with the -glycerol aromatic ethers of the present invention are cellulose nitrate, cellulose acetate, the methyl, ethyl, propyl, butyl celluloses, the vinyl resins such as vinyl chloride and vinyl acetate resins and the polymerized butadienes, and the alkyd type of resin such as are made from polyhydric alcohols and mono and polybasic acids.

The plasticisers of the present invention can be used with or without solvents in a manner well known in the art, depending on whether the material plasticised is to be used as a liquid (such as in paints and lacquers) or as a solid as in molding operations. The α-glycerol aromatic ethers of the present invention are soluble in most solvents such as the coal tar solvents, benzol, xylol, etc., the petroleum solvents such as gasoline, naphtha, etc., and also in oils such as linseed oil, China-wood oil, perilla oil and others used in making impregnating and coating materials.

An advantage of the present invention is that the α-glycerol aromatic ethers have high boiling points, low volatility and are liquid at normal and below temperatures and can be used in conjunction with solvents of high volatility without losing the α-glycerol ether on removing the solvent.

Having thus described my invention, what I claim and desire to protect by Letters Patent is:

1. The combination of a vinyl resin and a plasticiser therefor comprising an α-glycerol ether of a tertiary butyl phenol.

2. A composition of matter comprising material selected from the group consisting of synthetic resins and cellulose derivatives and a plasticiser therefor comprising an α-glycerol ether of a tertiary butyl phenol.

SOLOMON CAPLAN.